Patented Feb. 8, 1944

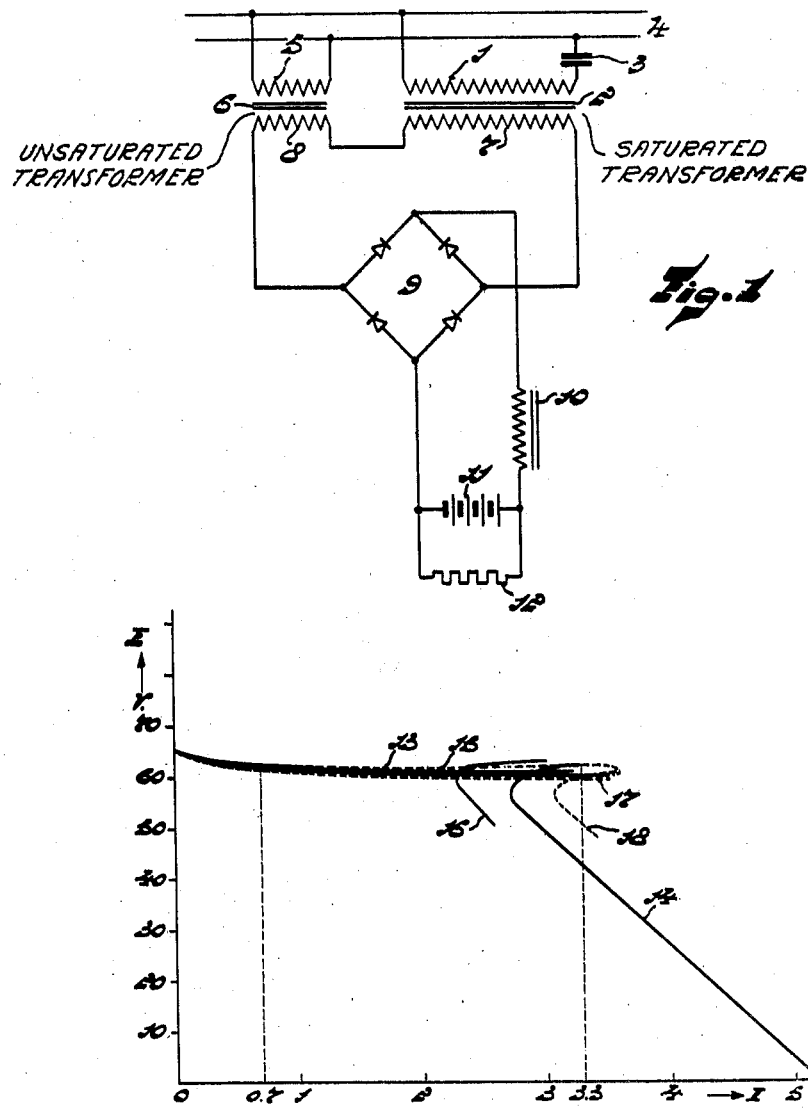

2,341,446

UNITED STATES PATENT OFFICE 2,341,446

DEVICE SUITABLE FOR CHARGING BATTERIES

Hendrik Abraham Wijnand Klinkhamer and Ewout Cassee, Eindhoven, Netherlands; vested in the Alien Property Custodian Application April 9, 1941, Serial No. 387,768 In the Netherlands May 25, 1940

5 Claims. (Cl. 171—119)

The invention relates to a device suitable for charging batteries and having a voltage-current characteristic which varies slightly in the case of comparatively small loads and yields a limitation of current in the case of larger loads. According to the invention, the device is characterized more particularly in that it comprises the primary winding of a saturated transformer, which winding is connected in series with a condenser to a source of alternating current, and an unsaturated transformer connected in parallel therewith to the source of alternating current whilst the secondary windings of the two transformers supply in series a rectifier. The no-load voltage of the unsaturated transformer has been so chosen with respect to that of the saturated transformer that upon the passage from the current-limiting portion of the said voltage-current characteristic to that portion thereof which varies slightly in voltage a voltage maximum is passed through. According to the invention, the series-connection of the secondary windings of the two transformers is such that when the condenser connected in series with the primary winding of the saturated transformer is short-circuited, the secondary voltages of the two transformers are in phase.

By the above expedient the advantage is obtained that in a region of high current intensity which occurs at the said voltage maximum a comparatively high voltage is available and voltage losses in this region of current intensity may be compensated to a more or less high extent.

In charging batteries, for example in an arrangement utilizing a buffer battery, the advantage is obtained that after a great consumption of current by the load which action places the operating point on the current limiting portion of the curve, the battery is steadily charged at a high current intensity so that the charging period is comparatively short. This high rate of charge continues until the said voltage maximum is reached.

When the device is utilised for charging batteries, the voltage maximum should preferably have a value such that on attaining this maximum, the battery is charged to the desired extent, for example, the battery voltage corresponds to the desired load voltage.

After the voltage maximum has been attained, the operating point (state-point) moves, when the charging is continued, in jumps along that portion of the voltage-current characteristic which varies slightly in voltage to a point of higher voltage in the voltage-current characteristic. This point is located in a portion which steadily increases in voltage in the region from low current intensity to a current intensity equal to zero. By providing a properly chosen baseload, it is possible to maintain the state-point in this portion of the current-voltage characteristic at a determined minimum of current intensity and thus at a determined maximum voltage which has been properly chosen in view of the load.

The secondary voltage of the unsaturated transformer is in general small with respect to the saturated transformer. It should, however, not be taken too small or else the voltage maximum in the above-mentioned passage, which is desired according to the invention, does not occur with higher current intensities.

It should be observed that in the above-mentioned cases all the advantages of a voltage-current characteristic having a portion which varies slightly in the case of comparatively small loads and a portion which yields a current-limitation in the case of larger loads, are retained.

In the following description of the drawing one embodiment of the invention will be described, by way of example, with reference to the appended drawing in which Figure 1 illustrates a circuit arrangement in accordance with the invention and Fig. 2 illustrates the voltage-current characteristic of the device of the invention.

In Fig. 1 the primary winding 1 of a highly saturated transformer 2 is connected, in series with a condenser 3, to alternating current mains 4. In parallel with the latter there is connected the primary winding 5 of an unsaturated transformer 6. The two secondary windings 7 and 8 supply in series a Grätz-system of rectifiers 9 which is connected through a choke coil 10 to a battery, for example, a buffer battery 11. A load in parallel with the battery 11 is denoted by 12.

By a proper choice of the no-load voltage of the unsaturated transformer 6 it is possible to obtain a voltage-current characteristic such as is shown in Fig. 2. The portion 13 exhibits a voltage E which varies slightly in the case of comparatively small loads whilst the portion 14 yields a current limitation upon larger loads.

According to the invention, the passage from the portion 13 to the portion 14 of the characteristic exhibits a voltage maximum which is located in the graph at a current intensity of about 3.3 amps. After the consuming apparatus 12, which may be, for example, a telephone exchange, has consumed a heavy current of say 3.5 amps., the battery will be charged with a high current intensity according to the portion 14 of the characteristic up to the voltage maximum of 62 volts which is located in this portion of the characteristic. This value has been chosen so as to be appropriate for the consuming apparatuses. Thus, for example, with automatic telephone exchanges use is made, for example, of relays which must not spark at the said voltage although, on account of the required sensitiveness, they respond even in the case of small voltage variations.

Upon a further increase of the battery voltage the state-point on the characteristic 14 jumps from 3.3 amps. to the point corresponding to 0.7 amp. of the characteristic 13, so that the charging of the battery may be slowly continued with a very low current intensity to a maximum of 65 volts until a new consumption of current causes a displacement to the right of the state-point on the characteristic. If, in view of sparking of the relays, the said voltage of 65 volts should be too high, it is possible, by utilising a base-load, for example a properly chosen resistance in parallel with the output terminals of the rectifier, to maintain a minimum consumption of current such that at the state-point the voltage remains below the sparking voltage of the relay.

As may furthermore be seen from Fig. 2 the portion 13 exhibits a slight diminution of voltage in the case of an increasing load.

From a great number of observations it has been found possible to draw up an empiric formula which may be utilised in many cases.

According to this formula the no-load voltage in volts on the unsaturated transformer must be taken larger than $$K \cdot f \cdot W_2 \cdot F \cdot 10^{-4}$$

wherein $K$ represents a factor which depends on the material of the magnetic circuit of the unsaturated transformer whilst $f$, $W_2$ and $F$ represent the frequency of the mains (for example 50 or 60 cycles), the number of turns of the secondary winding of the saturated transformer and the cross-sectional area of the magnetic circuit of the saturated transformer in square cms. respectively.

In one embodiment of the invention highly alloyed transformer sheet metal with which the above-mentioned factor $K$ was from 1.2 to 1.3 was taken for the material of the unsaturated transformer.

The curve 13, 14 applies to a mains voltage of 220 volts whereas the curves 15, 16 and 17, 18 apply to a mains voltage which is 5% lower and 5% higher respectively. It is distinctly clear therefrom that variations in the mains voltage have substantially no influence on the horizontal portion and have a comparatively slight influence on the steep portion of the characteristic.

What we claim is:

1. A device suitable for charging a battery and having a voltage-current characteristic in which the voltage varies slightly when the load is comparatively small and which has a transition portion and a current limitation when the load is larger, comprising a saturated transformer having a primary winding and a secondary winding, a condenser, said condenser and the primary winding being connected in series across a source of alternating current, an unsaturated transformer having a primary winding connected to said source of alternating current and a secondary winding, the secondary windings of the two transformers being connected in series and in phase with each other, and a voltage rectifier connected to said secondary windings, the no-load voltage of the secondary of the saturated transformer and the no-load voltage of the secondary winding of the unsaturated transformer having values at which the voltage obtained from the secondary windings exhibits a maximum in the transition portion of the voltage-current characteristic.

2. A device suitable for charging a battery and having a voltage-current characteristic in which the voltage varies slightly when the load is comparatively small and which has a transition portion and a current limitation when the load is larger, comprising a saturated transformer having a primary winding and a secondary winding, a condenser, said condenser and the primary winding being connected in series across a source of alternating current, an unsaturated transformer having a primary winding connected to said source of alternating current and a secondary winding having a low voltage in proportion to the voltage of the secondary winding of the saturated transformer, the secondary windings of the two transformers being connected in series and in phase with each other, and a voltage rectifier connected to said secondary windings, the no-load voltage of the secondary of the saturated transformer and the no-load voltage of the secondary of the unsaturated transformer having values at which the voltage obtained from the secondary windings exhibits a maximum in the transition portion of the said voltage-current characteristic.

3. A device suitable for charging a battery and having a voltage-current characteristic in which the voltage varies slightly when the load is comparatively small and which has a transition portion and a current limitation when the load is larger, comprising a saturated transformer having a primary winding and a secondary winding, a condenser, said condenser and the primary winding being connected in series across a source of alternating current, an unsaturated transformer having a primary winding connected to said source of alternating current and a secondary winding, the secondary windings of the two transformers being connected in series and in phase with each other, the no-load voltage of the secondary winding of the saturated transformer and the no-load voltage of the secondary winding of the unsaturated transformer having values at which the voltage obtained from the secondary windings exhibits a maximum in the transition portion of the said voltage-current characteristic, said maximum voltage corresponding to the desired operating voltage of the battery.

4. A device suitable for charging a battery and having a voltage-current characteristic in which the voltage varies slightly when the load is comparatively small and which has a transition portion and a current limitation when the load is larger, comprising a saturated transformed having a primary winding and a secondary winding, a condenser, said condenser and the primary winding being connected in series across a source of alternating current, an unsaturated transformer having a primary winding connected to said source of alternating current and a secondary winding, the secondary windings of the two transformers being connected in series and in phase with each other, and a voltage rectifier connected to said secondary windings, the no-load voltage of the secondary winding of the saturated transformer and the no-load voltage of the secondary winding of the unsaturated transformer having values at which the voltage obtained from the secondary windings exhibits a maximum in the transition portion of the said voltage-current characteristic, said voltage maximum being less than the value of the voltage derived from the rectifier when the load is small.

5. A device suitable for charging a battery and having a voltage-current characteristic in which the voltage varies slightly when the load is comparatively small and which has a transition portion and a current limitation when the load is larger, comprising a saturated transformer having a primary winding and a secondary winding, a condenser, said condenser and the primary winding being connected in series across a source of alternating current, an unsaturated transformer having a primary winding connected to said source of alternating current and a secondary winding, the secondary windings of the two transformers being connected in series and in phase with each other and a voltage rectifier connected to said secondary windings, the secondary winding of the unsaturated transformer having a no-load voltage output greater than the value $K \cdot f \cdot W_2 \cdot F \cdot 10^{-4}$ where K is a factor determined by the material of the unsaturated transformer, $f$ represents the frequency of the supply voltage, $W_2$ represents the number of turns of the secondary winding of the saturated transformer and F represents the cross-sectional area of the magnetic circuit of the saturated transformer in square centimeters.

HENDRIK ABRAHAM WIJNAND
KLINKHAMER.
EWOUT CASSEE.